United States Patent
Sugiyama et al.

(10) Patent No.: US 10,141,591 B2
(45) Date of Patent: Nov. 27, 2018

(54) FUEL CELL SYSTEM AND CONTROL METHOD OF THE SAME

(71) Applicant: TOYOTA JIDOSHA KABUSHIKI KAISHA, Toyota-shi, Aichi-ken (JP)

(72) Inventors: Naoki Sugiyama, Nisshin (JP); Atsuo Iio, Nagoya (JP); Kohei Oda, Toyota (JP); Tomio Yamanaka, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 95 days.

(21) Appl. No.: 15/444,697

(22) Filed: Feb. 28, 2017

(65) Prior Publication Data

US 2017/0256805 A1 Sep. 7, 2017

(30) Foreign Application Priority Data

Mar. 4, 2016 (JP) ................................. 2016-042206

(51) Int. Cl.
*H01M 8/04089* (2016.01)
*H01M 8/04746* (2016.01)
(Continued)

(52) U.S. Cl.
CPC ... *H01M 8/04753* (2013.01); *H01M 8/04089* (2013.01); *H01M 8/04111* (2013.01); *H01M 8/04395* (2013.01)

(58) Field of Classification Search
CPC .................. H01M 8/04753; H01M 8/04089
See application file for complete search history.

(56) References Cited

U.S. PATENT DOCUMENTS

2005/0233182 A1* 10/2005 Fuss .................. H01M 8/04089
429/442
2016/0137096 A1 5/2016 Oda et al.
(Continued)

FOREIGN PATENT DOCUMENTS

JP 2004-355890 12/2004
JP WO 2016027335 A1 * 2/2016 .............. H01M 8/04
(Continued)

*Primary Examiner* — Abdullah Riyami
*Assistant Examiner* — Nader Alhawamdeh
(74) *Attorney, Agent, or Firm* — Finnegan, Henderson, Farabow, Garrett & Dunner, LLP

(57) ABSTRACT

A fuel cell system comprises a controller configured to: (i) calculate a torque target value of a compressor and an opening position target value of a pressure regulation valve from a flow rate target value of a cathode gas and a pressure target value of a cathode gas flow path, the flow rate target value of the cathode gas and the pressure target value being determined according to a required power output of a fuel cell stack; (ii) calculate a torque feedback value of the compressor from a difference between a flow rate measurement value and the flow rate target value of the cathode gas, and control the compressor using a torque command value obtained by adding the torque target value and the torque feedback value; and (iii) calculate an opening position feedback value of the pressure regulation valve from a difference between a pressure measurement value and the pressure target value of the cathode gas flow path, and control an opening position of the pressure regulation valve using an opening position command value obtained by adding the opening position target value of the pressure regulation valve and a delayed opening position feedback value that is obtained by delaying the opening position feedback value. This configuration suppresses the hunting of the flow rate and the pressure.

10 Claims, 7 Drawing Sheets

(51) Int. Cl.
  *H01M 8/04111* (2016.01)
  *H01M 8/0438* (2016.01)

(56) References Cited

U.S. PATENT DOCUMENTS

| | | | |
|---|---|---|---|
| 2016/0138600 A1 | 5/2016 | Oda et al. | |
| 2016/0254555 A1* | 9/2016 | Chikugo | H01M 8/0432 |
| | | | 429/446 |
| 2016/0285117 A1 | 9/2016 | Tomita et al. | |
| 2017/0256805 A1* | 9/2017 | Sugiyama | H01M 8/04111 |
| 2017/0263960 A1* | 9/2017 | Iio | H01M 8/0494 |
| 2017/0352899 A1* | 12/2017 | Asai | H01M 8/04104 |

FOREIGN PATENT DOCUMENTS

| | | |
|---|---|---|
| JP | 2016-96051 | 5/2016 |
| JP | 2016-96681 | 5/2016 |
| WO | WO 2014/148164 A1 | 9/2014 |

* cited by examiner

FUEL CELL SYSTEM AND CONTROL METHOD OF THE SAME

CROSS-REFERENCE TO RELATED APPLICATIONS

The present application claims priority from Japanese patent application 2016-42206 filed on Mar. 4, 2016, the content of which is hereby incorporated by reference into this application.

BACKGROUND

Field

The present disclosure relates to a fuel cell system and a control method of the same.

Related Art

WO 2014/148164A describes a fuel cell system including a compressor configured to supply a cathode gas to a fuel cell stack and a pressure regulation valve configured to regulate the pressure of the cathode gas. This fuel cell system controls a supply amount of the cathode gas to the fuel cell stack, based on the torque of the compressor and the opening position of the pressure regulation valve.

In the fuel cell system described in WO 2014/148164A, however, simultaneous feedback control of the torque of the compressor and feedback control of the opening position of the pressure regulation valve are likely to cause hunting of the flow rate and the pressure of the cathode gas.

SUMMARY

In order to solve at least part the problems described above, the disclosure may be implemented by aspects described below.

(1) According to one aspect of the disclosure, there is provided a fuel cell system. The fuel cell system comprises: a fuel cell stack; a compressor configured to supply a cathode gas to the fuel cell stack through a cathode gas flow path; a pressure regulation valve configured to regulate a pressure of the cathode gas flow path; a flowmeter configured to measure a flow rate of the cathode gas that is to be supplied to the fuel cell stack; a pressure sensor configured to measure the pressure of the cathode gas flow path; and a controller. The controller is configured to: (i) calculate a torque target value of the compressor and an opening position target value of the pressure regulation valve from a flow rate target value of the cathode gas and a pressure target value of the cathode gas flow path, the flow rate target value of the cathode gas and the pressure target value being determined according to a required power output of the fuel cell stack; (ii) calculate a torque feedback value of the compressor from a difference between a flow rate measurement value and the flow rate target value of the cathode gas, and control the compressor using a torque command value obtained by adding the torque target value and the torque feedback value; and (iii) calculate an opening position feedback value of the pressure regulation valve from a difference between a pressure measurement value and the pressure target value of the cathode gas flow path, and control an opening position of the pressure regulation valve using an opening position command value obtained by adding the opening position target value of the pressure regulation valve and a delayed opening position feedback value that is obtained by delaying the opening position feedback value.

In the fuel cell system of this aspect, the controller calculates the opening position feedback value of the pressure regulation valve from the difference between the pressure measurement value and the pressure target value of the cathode gas flow path, and controls the opening position of the pressure regulation valve using the opening position command value obtained by adding the opening position target value and the delayed opening position feedback value that is obtained by delaying the opening position feedback value. Feedback of the opening position of the pressure regulation valve is accordingly performed with a delay from feedback of the torque of the compressor. This results in suppressing the hunting of the flow rate and the pressure of the cathode gas.

(2) The fuel cell system according to the above aspect; wherein the controller may comprise a delay processor configured to delay the opening position feedback value, the delay processor may include at least one of: a first delay processor configured to perform at least one of a first-order delay, a second-order delay, and a dead time delay; and a second delay processor configured to replace the opening position feedback value with zero for a time period from a change of at least one of the torque target value and the opening position target value until satisfaction of a predetermined judgement condition.

The fuel cell system of this aspect comprises at least one of the first delay processor and the second delay processor. This configuration enables the opening position feedback value to be delayed appropriately.

(3) The fuel cell system according to the above aspect; wherein the controller may comprise the second delay processor, and the judgement condition may be that an absolute value of the torque feedback value becomes equal to or less than a predetermined reference value.

In the fuel cell system of this aspect, feedback of the opening position of the pressure regulation valve is performed with a further delay from feedback of the torque of the compressor. This configuration thus further suppresses the hunting of the flow rate and the pressure of the cathode gas.

(4) The fuel cell system according to the above aspect; wherein the controller may comprise the second delay processor, and the judgement condition may include at least one of a condition that an absolute value of the difference between the flow rate measurement value and the flow rate target value of the cathode gas becomes equal to or less than a predetermined reference value and a condition that an absolute value of an amount of change of the flow rate measurement value of the cathode gas per unit time becomes equal to or less than a predetermined reference value.

In the fuel cell system of this aspect, feedback of the opening position of the pressure regulation valve is performed with a further delay from feedback of the torque of the compressor. This configuration thus further suppresses the hunting of the flow rate and the pressure of the cathode gas.

(5) The fuel cell system according to the above aspect; wherein the controller may comprise the second delay processor, and the judgement condition may include at least one of a condition that an absolute value of the difference between the pressure measurement value and the pressure target value of the cathode gas flow path becomes equal to or less than a predetermined reference value and a condition that an absolute value of an amount of change of the pressure measurement value of the cathode gas flow path per unit time becomes equal to or less than a predetermined reference value.

In the fuel cell system of this aspect, feedback of the opening position of the pressure regulation valve is performed with a further delay from feedback of the torque of the compressor. This configuration thus further suppresses the hunting of the flow rate and the pressure of the cathode gas.

(6) According to one aspect of the disclosure, there is provided a control method of a fuel cell system comprising a fuel cell stack; a compressor configured to supply a cathode gas to the fuel cell stack through a cathode gas flow path; a pressure regulation valve configured to regulate a pressure of the cathode gas flow path; a flowmeter configured to measure a flow rate of the cathode gas that is to be supplied to the fuel cell stack; and a pressure sensor configured to measure the pressure of the cathode gas flow path. The control method comprises the steps of: (i) calculating a torque target value of the compressor and an opening position target value of the pressure regulation valve from a flow rate target value of the cathode gas and a pressure target value of the cathode gas flow path, the flow rate target value of the cathode gas and the pressure target value being determined according to a required power output of the fuel cell stack; (ii) calculating a torque feedback value of the compressor from a difference between a flow rate measurement value and the flow rate target value of the cathode gas, and controlling the compressor using a torque command value obtained by adding the torque target value and the torque feedback value; and (iii) calculating an opening position feedback value of the pressure regulation valve from a difference between a pressure measurement, value and the pressure target value of the cathode gas flow path, and controlling an opening position of the pressure regulation valve using an opening position command value obtained by adding the opening position target value of the pressure regulation valve and a delayed opening position feedback value that is obtained by delaying the opening position feedback value.

The control method of this aspect calculates the opening position feedback value of the pressure regulation valve from the difference between the pressure measurement value and the pressure target value of the cathode gas flow path, and controls the opening position of the pressure regulation valve using the opening position command value obtained by adding the opening position target value and the delayed opening position feedback value that is obtained by delaying the opening position feedback value. Feedback of the opening position of the pressure regulation valve is accordingly performed with a delay from feedback of the torque of the compressor. This results in suppressing the hunting of the flow rate and the pressure of the cathode gas.

The disclosure may be implemented by any of various aspects other than the fuel cell system, for example, a moving body with the fuel cell system mounted thereon and a control method of the fuel cell system.

DESCRIPTION OF EMBODIMENTS

First Embodiment

Figure 1:
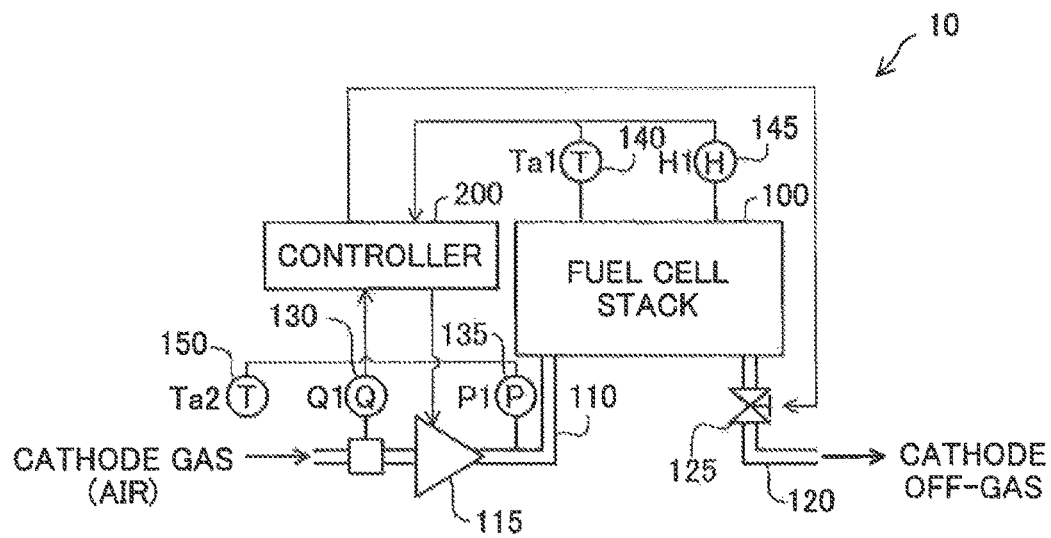
FIG. 1 is a diagram schematically illustrating a cathode gas system in a fuel cell system.

FIG. 1 is a diagram schematically illustrating a cathode gas system in a fuel cell system 10. The fuel cell system 10 is mounted on a moving body, such as a vehicle. The fuel cell system 10 may include a fuel cell stack 100, a cathode gas flow path 110, a cathode off-gas flow path 120, a compressor 115, a pressure regulation valve 125, a flowmeter 130, a pressure sensor 135, a temperature sensor 140 and a humidity sensor 145 for the fuel cell stack 100, an ambient temperature sensor 150 and a controller 200. The compressor 115 is provided in the cathode gas flow path 110 and is configured to supply the air as a cathode gas through the cathode gas flow path 110 to the fuel cell stack 100. According to this embodiment, a turbo-type compressor is employed for the compressor 115. The pressure regulation valve 125 is provided in the cathode off-gas flow path 120 and is configured to regulate the pressure of the cathode gas flow path 110. The flowmeter 130 is configured to measure flow rate $Q1$ of the cathode gas that is to be supplied to the fuel cell stack 100. The pressure sensor 135 is configured to measure pressure $P1$ of the cathode gas flow path 110 on an outlet side of the compressor 115 (i.e., on an inlet side of the fuel cell stack 100). The temperature sensor 140 is configured to measure temperature $Ta1$ of a cathode gas flow path inside the fuel cell stack 100. The humidity sensor 145 is configured to measure humidity $H1$ of the cathode gas flow path inside the fuel cell stack 100. The ambient temperature sensor 150 is configured to measure ambient temperature $Ta2$.

The controller 200 calculates a required value of electric power (required power output) that is to be generated by the fuel cell stack 100, based on the speed of the moving body, the depression amount of an accelerator pedal and the depression amount of a brake pedal (relevant sensors are not shown). The controller 200 then controls the operations of the compressor 115 and the pressure regulation valve 125, based on the required power output of the fuel cell stack 100. This control will be described later in detail.

Figure 2:
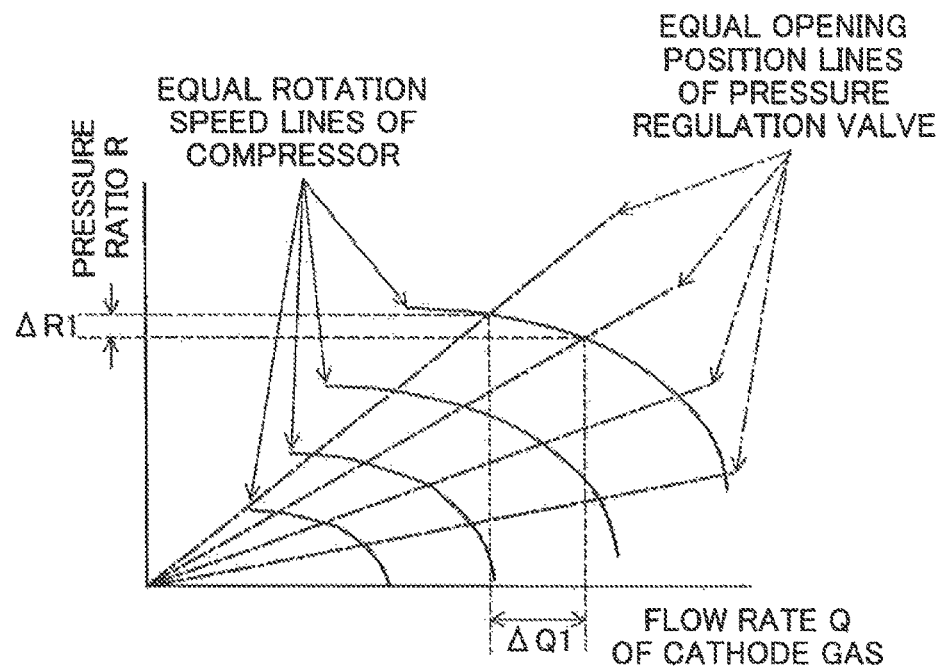
FIG. 2 is a graph showing a relationship between pressure ratio of the compressor and flow rate of the cathode gas under rotation speed control.
Figure 3:
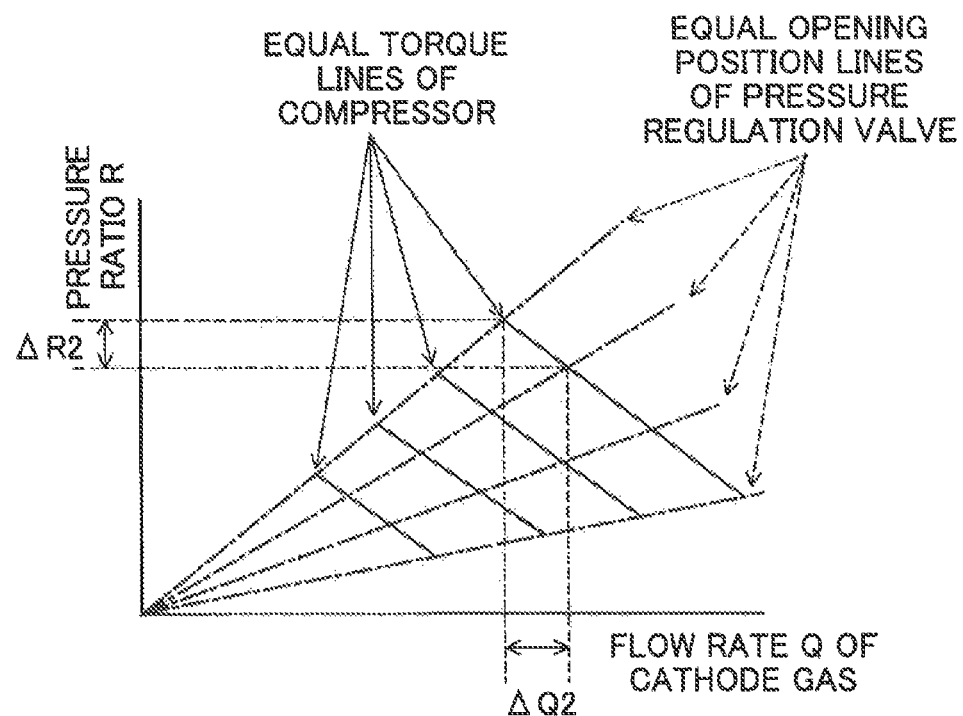
FIG. 3 is a graph showing a relationship between the pressure ratio of the compressor and the flow rate of the cathode gas under torque control.

FIG. 2 is a graph showing a relationship between pressure ratio R of the compressor 115 (i.e., pressure at an outlet of the compressor 115/pressure at an inlet of the compressor 115) and flow rate Q of the cathode gas under rotation speed control. FIG. 3 is a graph showing a relationship between the pressure ratio R of the compressor 115 and the flow rate Q of the cathode gas under torque control. The graph of FIG. 2 shows the relationship between the pressure ratio R and the flow rate Q of the cathode gas when the rotation speed of the compressor 115 is kept constant (i.e., under rotation speed control). The graph of FIG. 3, on the other hand, shows the relationship between the pressure ratio R and the flow rate Q of the cathode gas when the torque of the compressor 115 is kept constant (i.e., under torque control). Comparison between a rate of change in the flow rate of the cathode gas/pressure ratio ($\Delta Q1/\Delta R1$) under rotation speed control and a rate of change in the flow rate of the cathode gas/pressure ratio (ΔQ2/ΔR2) under torque control shows that the ratio of an amount of change ΔQ in the flow rate Q of the cathode gas to an amount of change ΔR in the pressure ratio R under torque control is smaller than that under rotation speed control. In the case of controlling the compressor 115 based on the measured pressure P1 of the cathode gas flow path 110, the torque control has the smaller ratio of the amount of change ΔQ in the flow rate Q of the cathode gas to the amount of change ΔR in the pressure ratio R and is thus expected to ensure more accurate control of the flow rate Q of the cathode gas, compared with the rotation speed control. The torque control is accordingly employed in the embodiment described below. In the graphs of FIG. 2 and FIG. 3, when the pressure at the inlet of the compressor 115 is the atmospheric pressure (approximately 1 atm), the value of the pressure ratio R expressed in the unit of [atm] is approximately equal to the value of the pressure at the outlet of the compressor 115.

Figure 4:
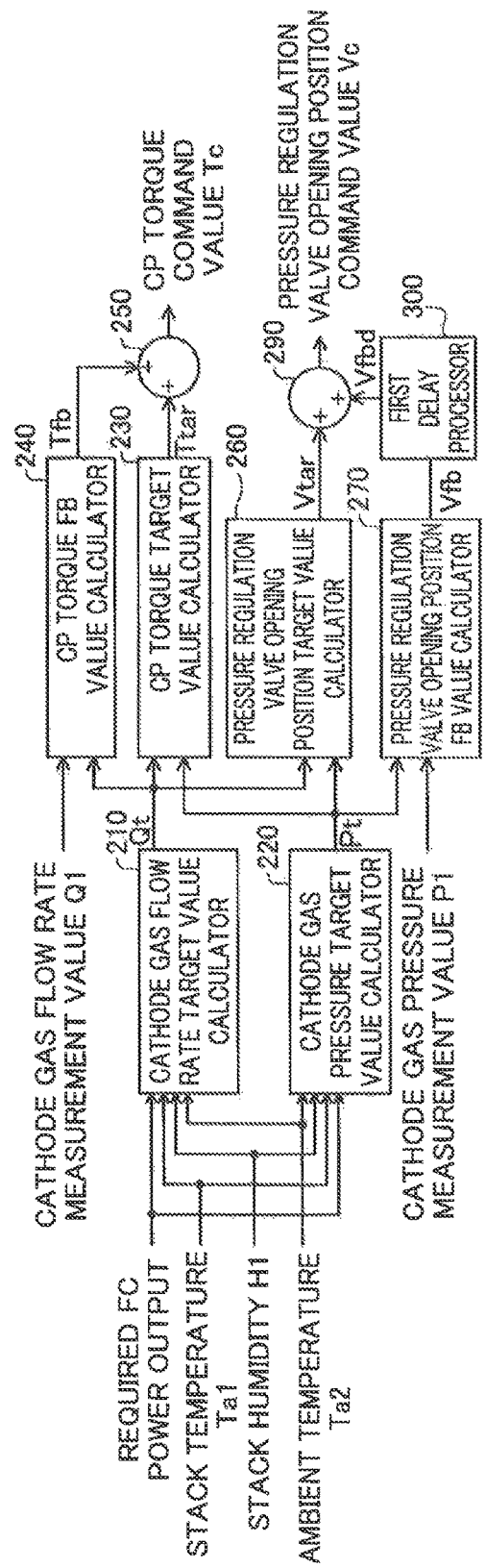
FIG. 4 is a diagram illustrating the configuration of the controller 200 according to the first embodiment.

FIG. 4 is a diagram illustrating the configuration of the controller 200 according to the first embodiment. The controller 200 may include a cathode gas flow rate target value calculator 210, a cathode gas pressure target value calculator 220, a compressor torque target value calculator 230 (also called "CP torque target value calculator 230"), a compressor feedback value calculator 240 (also called "CP torque FB value calculator 240"), a first adder 250, a pressure regulation valve opening position target value calculator 260, a pressure regulation valve opening position feedback value calculator 270 (also called "pressure regulation valve opening position FB value calculator 270"), a second adder 290 and a first delay processor 300.

The cathode gas flow rate target value calculator 210 calculates a flow rate target value Qt of the cathode gas that is to be supplied to the fuel cell stack 100, based on the required power output of the fuel cell stack 100 (also called "required FC power output"), the temperature Ta1 and the humidity H1 in the fuel cell stack 100, and the ambient temperature Ta2. For example, the flow rate target value Qt of the cathode gas increases with an increase in the required FC power output. A relationship of the flow rate target value Qt of the cathode gas to the required FC power output, the temperature Ta1 and the humidity H1 in the fuel cell stack 100 and the ambient temperature Ta2 may be determined experimentally or otherwise in advance and may be stored in the form of a map. According to another embodiment, the flow rate target value Qt of the cathode gas may be determined based on only the required FC power output without taking into account the temperature Ta1 and the humidity H1 in the fuel cell stack 100 and the ambient temperature Ta2.

The cathode gas pressure target value calculator 220 calculates a target value Pt of pressure of the cathode gas flow path 110 (i.e., pressure of the cathode gas to be supplied to the fuel cell stack 100), based on the required FC power output of the fuel cell stack 100, the temperature Ta1 and the humidity H1 in the fuel cell stack 100, and the ambient temperature Ta2. A relationship of the pressure target value Pt of the cathode gas flow path 110 to the required FC power output, the temperature Ta1 and the humidity H1 in the fuel cell stack 100 and the ambient temperature Ta2 may be determined experimentally or otherwise in advance and may be stored in the form of a map. According to another embodiment, the pressure target value Pt of the cathode gas flow path 110 may be determined based on only the required FC power output without taking into account the temperature Ta1 and the humidity H1 in the fuel cell stack 100 and the ambient temperature Ta2.

The CP torque target value calculator 230 calculates a compressor torque target value Ttar (also called "CP torque target value Ttar" or simply called "torque target value Ttar") using the flow rate target value Qt of the cathode gas and the pressure target value Pt of the cathode gas flow path 110. The CP torque target value Ttar may be calculated from the flow rate target value Qt of the cathode gas and the pressure target value Pt of the cathode gas flow path 110 according to the relationship shown in FIG. 3. The relationship between the combination of the flow rate Q of the cathode gas and the pressure ratio R of the compressor 115 and the combination of the opening position of the pressure regulation valve 125 and the torque of the compressor 115 shown in FIG. 3 may be stored in advance in the form of, for example, a map, a function or a lookup table in a non-volatile memory of the controller 200.

The CP torque FB value calculator 240 calculates a compressor torque feedback value Tfb (also called "CP torque FB value Tfb" or simply called "torque FB value Tfb") from a difference ΔQ (=Qt−Q1: "difference" is also called "deviation") between the flow rate target value Qt and a flow rate measurement value Q1 of the cathode gas. When the flow rate measurement value Q1 of the cathode gas is higher than the flow rate target value Qt of the cathode gas, the CP torque FB value Tfb takes a negative value. When the flow rate measurement value Q1 of the cathode gas is lower than the flow rate target value Qt of the cathode gas, on the other hand, the CP torque FB value Tfb takes a positive value.

For example, PID operation or PI operation may be employed for calculation of the CP torque FB value Tfb. In the case of PID operation, for example, the CP torque FB value Tfb may be calculated according to an equation (1) given below:

$$Tfb = Kp \times \Delta Q + Ki \int_0^t \Delta Q dt + Kd \frac{d\Delta Q}{dt} \quad (1)$$

where Kp, Ki and Kd denote coefficients. Kd may be equal to zero (this case is equivalent to PI operation), but it is preferable that Kp and Ki are not equal to zero. In the equation (1) given above, the right side does not include the CP torque target value Ttar but includes only terms relating to the difference ΔQ of the flow rate. Accordingly, as the difference ΔQ approaches to zero, the CP torque FB value Tfb also approaches to zero.

The first adder 250 adds the CP torque target value Ttar and the CP torque FB value Tfb to calculate a compressor torque command value Tc (also called "CP torque command value Tc").

The pressure regulation valve opening position target value calculator 260 calculates an opening position target value Vtar of the pressure regulation valve 125 using the flow rate target value Qt of the cathode gas and the pressure target value Pt of the cathode gas flow path 110. The opening position target value Vtar may be calculated from the flow rate target value Qt of the cathode gas and the pressure target value Pt of the cathode gas flow path 110 according to the relationship shown in FIG. 3.

The pressure regulation valve opening position FB value calculator 270 calculates an opening position feedback value Vfb (also called "opening position FB value Vfb") of the pressure regulation valve 125 from a difference ΔP (=Pt−P1) between the pressure target value Pt and a pressure measurement value P1 of the cathode gas flow path 110. As in the case of calculation of the CP torque FB value Tfb, PID) operation or PI operation may be employed for calculation of the opening position FB value Vfb. When the pressure measurement value P1 of the cathode gas flow path 110 is higher than the pressure target value Pt of the cathode gas flow path 110, the opening position FB value Vfb takes a positive value (to increase the opening position of the pressure regulation valve 125, in order to decrease the pressure of the cathode gas flow path 110). When the pressure measurement value P1 of the cathode gas flow path 110 is lower than the pressure target value Pt of the cathode gas flow path 110, on the other hand, the opening position FB value Vfb takes a negative value (to decrease the opening position of the pressure regulation valve 125, in order to increase the pressure of the cathode gas flow path 110).

The first delay processor 300 delays the opening position FB value Vfb by a predetermined delay amount to generate a delayed opening position feedback value Vfbd (also called "delayed opening position FB value Vfbd") and sends the delayed opening position FB value Vfbd to the second adder 290. A processor configured to perform at least one of a first-order delay process or second-order delay process and a dead time delay process may be employed for the first delay processor 300. The first-order delay process denotes a process of generating the delayed opening position FB value Vfbd by first derivation of the opening position FB value Vfb. The second-order delay process denotes a process of generating the delayed opening position FB value Vfbd by first derivation and second derivation of the opening position FB value Vfb. The dead time delay process denotes a process of providing a simple delay by a predetermined time period. The delay time in the dead time delay process may be a fixed value or may be increased with an increase in an amount of change of the CP torque command value Tc. The first-order delay process or the second-order delay process may be employed in combination with the dead time delay process. The second adder 290 adds the opening position target value Vtar and the delayed opening position FB value Vfbd to calculate a pressure regulation valve opening position command value Vc.

As described in BACKGROUND, in the fuel cell system 10 including the compressor 115 and the pressure regulation valve 125, simultaneously performing feedback control of the compressor 115 and feedback control of the pressure regulation valve 125 is likely to cause hunting of the flow rate of the cathode gas and the pressure of the cathode gas flow path 110. The first embodiment accordingly calculates the pressure regulation valve opening position command value Vc by adding the opening position target value Vtar and the delayed opening position FB value Vfbd. As a result, feedback of the opening position of the pressure regulation valve 125 is performed with a delay from feedback of the torque of the compressor 115. This results in suppressing the hunting of the flow rate of the cathode gas and the pressure of the cathode gas flow path 110.

Second Embodiment

Figure 5:
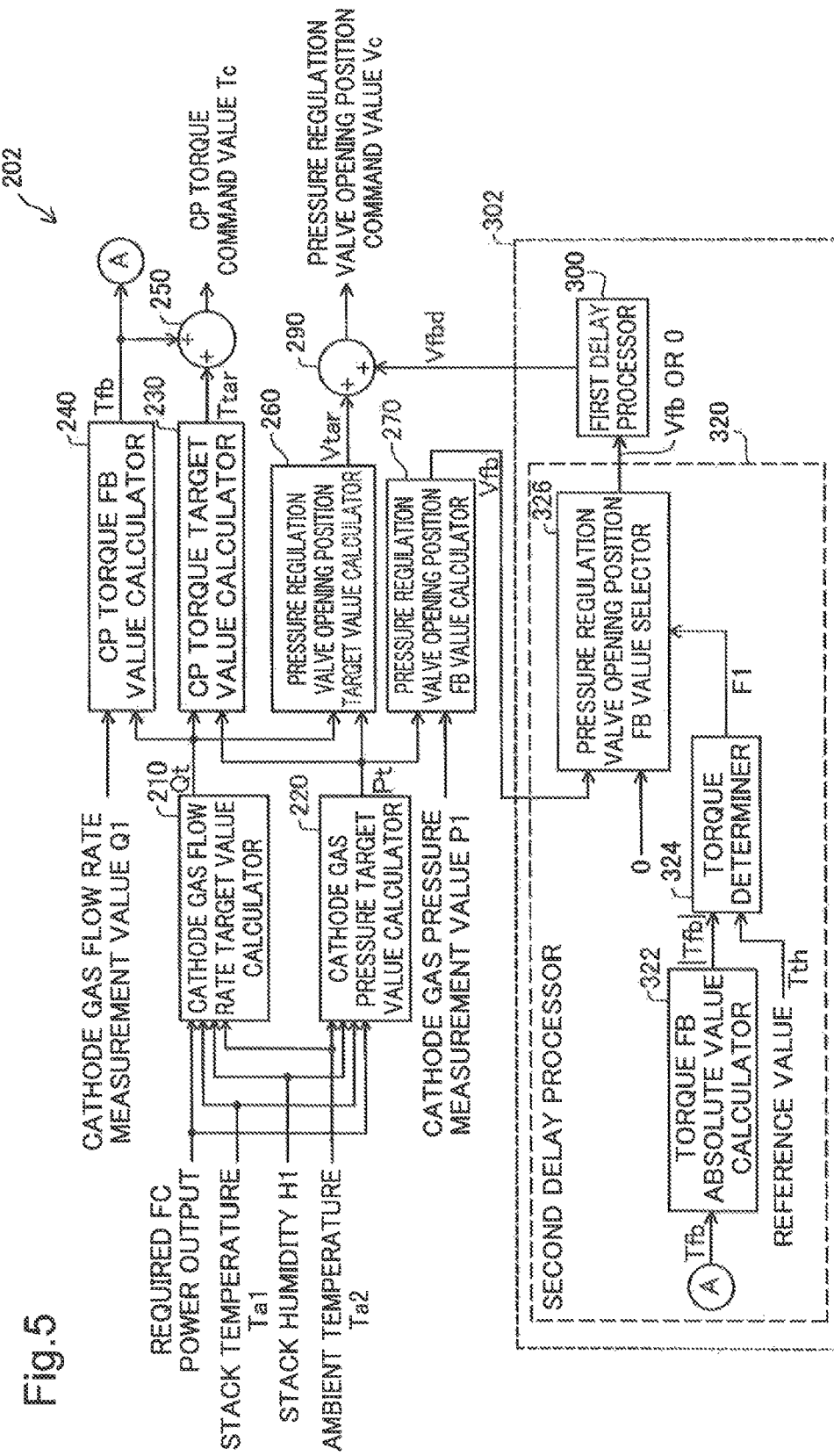
FIG. 5 is a diagram illustrating the configuration of a controller according to a second embodiment.

FIG. 5 is a diagram illustrating the configuration of a controller 202 according to a second embodiment. The difference from the controller 200 of the first embodiment is that the controller 202 includes a delay processor 302. The delay processor 302 includes a first delay processor 300 and a second delay processor 320. The first delay processor 300 of the second embodiment is similar to the first delay processor 300 of the first embodiment. The second delay processor 320 may include a torque feedback absolute value calculator 322 (also called "torque FB absolute value calculator 322"), a torque determiner 324 and a pressure regulation valve opening position feedback value selector 326 (also called "pressure regulation valve opening position FB value selector 326"). The following describes the differences from the first embodiment.

The torque FB absolute value calculator 322 calculates an absolute value |Tfb| of the CP torque FB value Tfb. The CP torque FB value Tfb may take a positive value or a negative value, so that its absolute value |Tfb| is suitably used to indicate the magnitude of feedback. The torque determiner 324 judges whether the absolute value |Tfb| of the CP torque FB value Tfb becomes equal to or less than a predetermined reference value Tth and outputs a selection flag F1. The pressure regulation valve opening position FB value selector 326 selects either the opening position FB value Vfb or zero based on the selection flag F1 and outputs the result of selection to the first delay processor 300. More specifically, the second delay processor 320 outputs the opening position FB value Vfb to the first delay processor 300 when |Tfb|≤Tth, while outputting zero to the first delay processor 300 when |Tfb|>Tth. The relation of |Tfb|>Tth may be satisfied after at least one of the CP torque target value Ttar and the opening position target value Vtar is changed. Accordingly the second delay processor 320 replaces the opening position FB value Vfb with zero for a time period from a change of at least one of the CP torque target value Ttar and the opening position target value Vtar to satisfaction that the absolute value |Tfb| of the CP torque FB value Tfb becomes equal to or less than the predetermined reference value Tth. As a result, feedback control of the opening position of the pressure regulation valve 125 is not started until the absolute value |Tfb| of the CP torque FB value Tfb becomes equal to or less than the predetermined reference value Tth. Some time is required until the absolute value |Tfb| of the CP torque FIB value Tfb becomes equal to or less than the predetermined reference value Tth. Feedback of the opening of the pressure regulation valve 125 is thus further delayed, compared with feedback in the first embodiment.

As described above, the second embodiment does not start feedback control of the opening position of the pressure regulation valve 125 for a time period from a change of at least one of the CP torque target value Ttar and the opening position target value Vtar to satisfaction of the judgement condition that the absolute value |Tfb| of the CP torque FB value Tfb becomes equal to or less than the predetermined reference value Tt. As a result, this configuration further suppresses the hunting of the flow rate of the cathode gas and the pressure of the cathode gas flow path 110.

Third Embodiment

Figure 6:
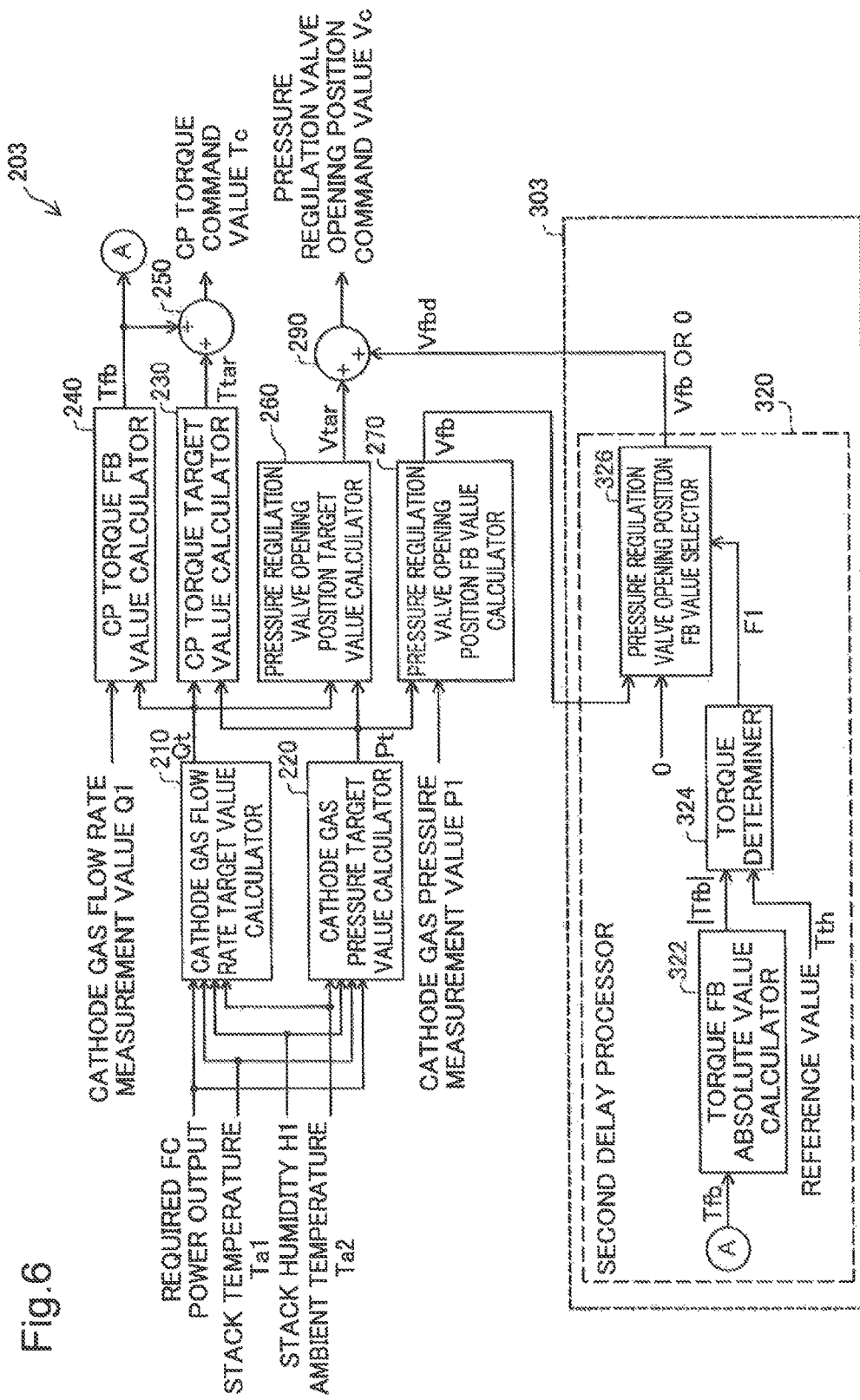
FIG. 6 is a diagram illustrating the configuration of a controller according to a third embodiment.

FIG. 6 is a diagram illustrating the configuration of a controller 203 according to a third embodiment. The controller 203 of the third embodiment includes a delay processor 303 that omits the first delay processor 300 from the controller 202 of the second embodiment. Some time is required until the absolute value |Tfb| of the CP torque FB value Tfb becomes sufficiently small. Feedback of the opening position of the pressure regulation valve 125 is thus performed with a delay from feedback of the torque of the compressor 115 even in the configuration without the first delay processor 300. As a result, this configuration suppresses the hunting of the flow rate of the cathode gas and the pressure of the cathode gas flow path 110.

Fourth Embodiment

Figure 7:
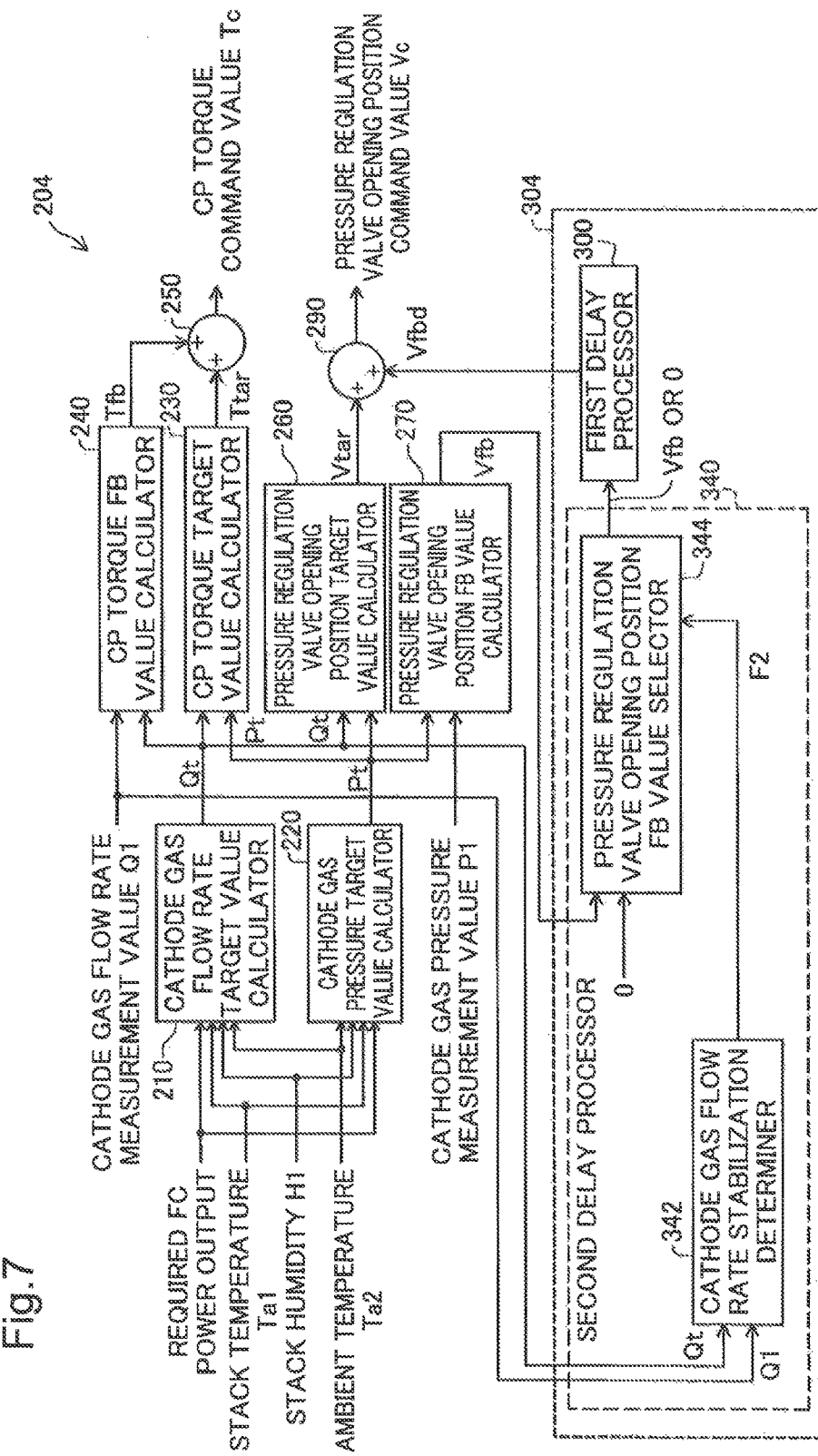
FIG. 7 is a diagram illustrating the configuration of a controller according to a fourth embodiment.

FIG. 7 is a diagram illustrating the configuration of a controller 204 according to a fourth embodiment. The difference from the controller 200 of the first embodiment is that the controller 204 includes a delay processor 304. The delay processor 304 includes a first delay processor 300 and a second delay processor 340. The first delay processor 300 of the fourth embodiment is similar to the first delay processor 300 of the first embodiment. The second delay processor 340 may include a cathode gas flow rate stabilization determiner 342 and a pressure regulation valve opening position feedback value selector 344 (also called "pressure regulation valve opening position FB value selector 344"). The following describes the differences from the first embodiment.

The cathode gas flow rate stabilization determiner 342 judges whether the flow rate of the cathode gas is stabilized and outputs a selection flag F2. The judgement of whether the flow rate of the cathode gas is stabilized may depend on a judgement of whether one of judgement conditions (a1) to (a3) given below is satisfied:

(a1) condition that an absolute value of a difference between a flow rate measurement value Q1 and a flow rate target value Qt of the cathode gas becomes equal to or less than a predetermined reference value Qth;

(a2) condition that an absolute value of an amount of change $\Delta Q1/dt$ of the flow rate measurement value Q1 of the cathode gas per unit time becomes equal to or less than a predetermined reference value dQth; and (a3) condition that the absolute value of the difference between the flow rate measurement value Q1 and the flow rate target value Qt of the cathode gas becomes equal to or less than the predetermined reference value Qth and that the absolute value of the amount of change $\Delta Q1/dt$ of the flow rate measurement value Q1 of the cathode gas per unit time becomes equal to or less than the predetermined reference value dQth.

The flow rate of the cathode gas is most stabilized when the judgement condition (a3) is satisfied. It is accordingly preferable to use this judgement condition (a3) for such judgement.

The pressure regulation valve opening position FB value selector 344 outputs the opening position FB value Vfb to the first delay processor 300 upon satisfaction of the judgement condition that the flow rate of the cathode gas is stabilized, while outputting zero to the first delay processor 300 upon non-satisfaction of the judgement, condition. In other words, the second delay processor 340 replaces the opening position FB value Vfb with zero for a time period from a change of at least one of the CP torque target value Ttar and the opening position target value Vtar to satisfaction of a judgement condition selected in advance among the above judgement conditions (a1) to (a3). Some time is required until the flow rate of the cathode gas is stabilized. Feedback of the opening of the pressure regulation valve 125 is thus further delayed, compared with feedback in the first embodiment. As a result, this configuration further suppresses the hunting of the flow rate of the cathode gas and the pressure of the cathode gas flow path 110.

One of judgement conditions (b1) to (b3) given below may be used instead of the above judgement conditions (a1) to (a3):

(b1) condition that an absolute value of a difference between a pressure measurement value P1 and a pressure target value Pt of the cathode gas becomes equal to or less than a predetermined reference value Pth;

(b2) condition that an absolute value of an amount of change $\Delta P1/dt$ of the pressure measurement value P1 of the cathode gas per unit time becomes equal to or less than a predetermined reference value dPth; and (b3) condition that the absolute value of the difference between the pressure measurement value P1 and the pressure target value Pt of the cathode gas becomes equal to or less than the predetermined reference value Pth and that the absolute value of the amount of change $\Delta P1/dt$ of the pressure measurement value P1 of the cathode gas per unit time becomes equal to or less than the predetermined reference value dPth.

These judgement conditions (b1) to (b3) correspond to the judgement condition that the pressure of the cathode gas is stabilized. When these judgement conditions (b1) to (b3) are employed, the cathode gas flow rate stabilization determiner 342 is replaced with a cathode gas pressure stabilization determiner (not shown).

As in the case of employing the above judgement conditions (a1) to (a3), in the case of employing these judgement conditions (b1) to (b3), feedback of the opening position of the pressure regulation valve 125 is delayed. This configuration accordingly suppresses the hunting of the flow rate of the cathode gas and the pressure of the cathode gas flow path 110.

The cathode gas flow rate stabilization determiner 342 or the cathode gas pressure stabilization determiner may perform the process of replacing the opening position FB value Vfb with zero again when the judgement condition becomes unsatisfied after satisfaction. This configuration more effectively suppresses the hunting of the flow rate of the cathode gas and the pressure of the cathode gas flow path 110.

Fifth Embodiment

Figure 8:
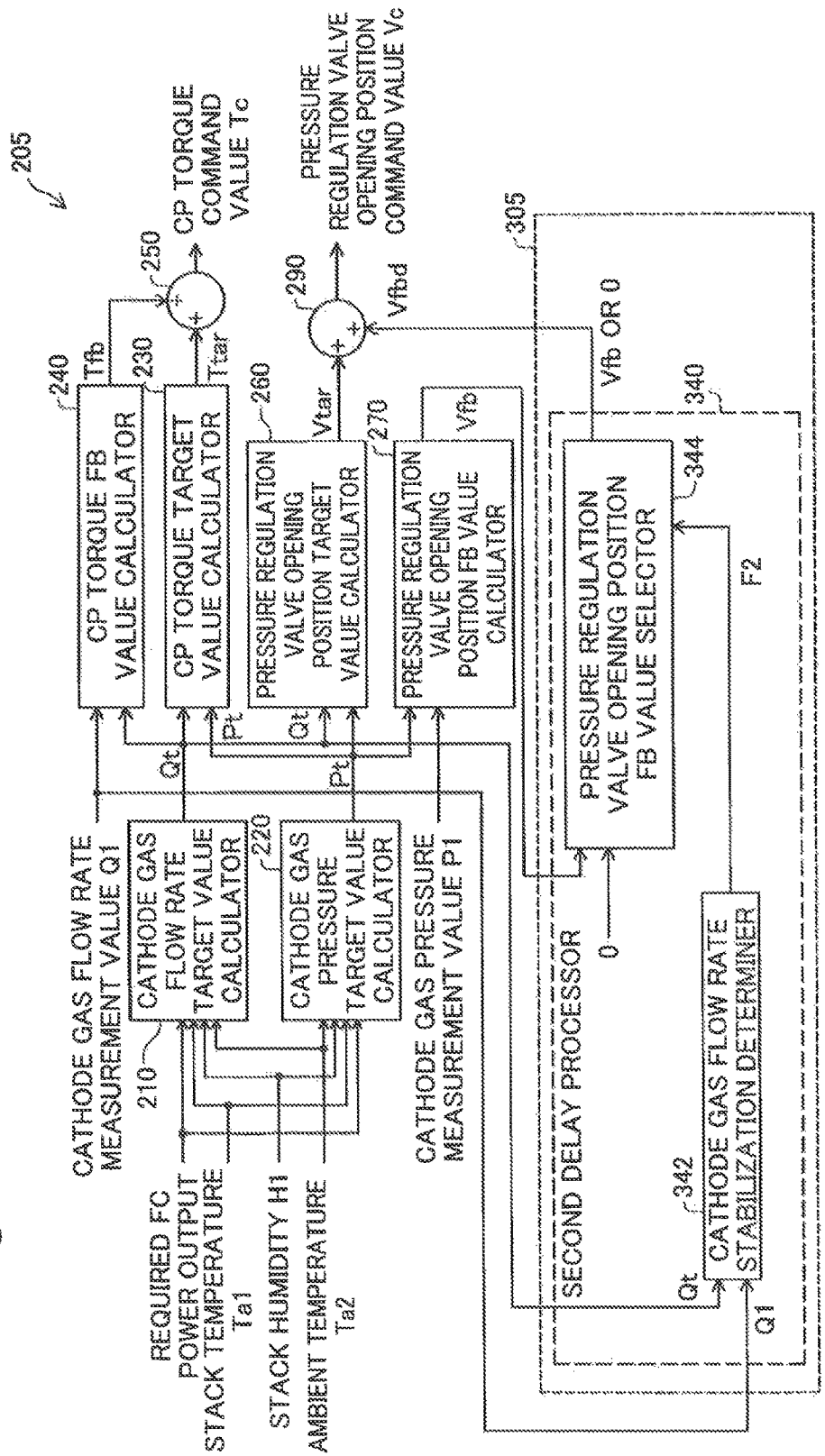
FIG. 8 is a diagram illustrating the configuration of a controller according to a fifth embodiment.

FIG. 8 is a diagram illustrating the configuration of a controller 205 according to a fifth embodiment. The controller 205 of the fifth embodiment includes a delay processor 305 that omits the first delay processor 300 from the controller 204 of the fourth embodiment. Some time is required until the flow rate of the cathode gas is stabilized. Feedback of the opening position of the pressure regulation valve 125 is thus performed with a delay from feedback of the torque of the compressor 115 even in the configuration without the first delay processor 300. As a result, this configuration suppresses the hunting of the flow rate of the cathode gas and the pressure of the cathode gas flow path 110. The same applies to a configuration that the cathode gas flow rate stabilization determiner 342 is replaced with the cathode gas pressure stabilization determiner.

Modification

Any judgement condition other than those described in the above second to fourth embodiments may be employed as the judgement condition in the second delay processor 320 or 340 (shown in FIGS. 5 to 7). The second delay processor may thus be configured to replace the opening position FB value Vfb with zero for a time period from a change of at least one of the torque target value Ttar of the compressor 115 and the opening position target value Vtar of the pressure regulation valve 125 to satisfaction of a predetermined judgement condition. This judgement condition is preferably different from a condition that a predetermined fixed time has elapsed (i.e., condition equivalent to the dead time delay).

The foregoing describes some aspects of the disclosure with reference to some embodiments. The embodiments of the disclosure described above are provided only for the purpose of facilitating the understanding of the disclosure and not for the purpose of limiting the disclosure in any sense. The disclosure may be changed, modified and altered without departing from the scope of the disclosure and includes equivalents thereof.

What is claimed is:

1. A fuel cell system, comprising:
a fuel cell stack;
a compressor configured to supply a cathode gas to the fuel cell stack through a cathode gas flow path;
a pressure regulation valve configured to regulate a pressure of the cathode gas flow path;
a flowmeter configured to measure a flow rate of the cathode gas that is to be supplied to the fuel cell stack;
a pressure sensor configured to measure the pressure of the cathode gas flow path; and
a controller, wherein
the controller is configured to:
(i) calculate a torque target value of the compressor and an opening position target value of the pressure regulation valve from a flow rate target value of the cathode gas and a pressure target value of the cathode gas flow path, the flow rate target value of the cathode gas and the pressure target value being determined according to a required power output of the fuel cell stack;
(ii) calculate a torque feedback value of the compressor from a difference between a flow rate measurement value and the flow rate target value of the cathode gas, and control the compressor using a torque command value obtained by adding the torque target value and the torque feedback value; and
(iii) calculate an opening position feedback value of the pressure regulation valve from a difference between a pressure measurement value and the pressure target value of the cathode gas flow path, and control an opening position of the pressure regulation valve using an opening position command value obtained by adding the opening position target value of the pressure regulation valve and a delayed opening position feedback value that is obtained by delaying the opening position feedback value.

2. The fuel cell system according to claim 1,
wherein the controller comprises, as a delay processor configured to delay the opening position feedback value, at least one of:
a first delay processor configured to perform at least one of a first-order delay or a second-order delay and a dead time delay; and
a second delay processor configured to replace the opening position feedback value with zero for a time period from a change of at least one of the torque target value and the opening position target value until satisfaction of a predetermined judgement condition.

3. The fuel cell system according to claim 2,
wherein the controller comprises the second delay processor, and
the judgement condition is that an absolute value of the torque feedback value becomes equal to or less than a predetermined reference value.

4. The fuel cell system according to claim 2,
wherein the controller comprises the second delay processor, and
the judgement condition includes at least one of a condition that an absolute value of the difference between the flow rate measurement value and the flow rate target value of the cathode gas becomes equal to or less than a predetermined reference value and a condition that an absolute value of an amount of change of the flow rate measurement value of the cathode gas per unit time becomes equal to or less than a predetermined reference value.

5. The fuel cell system according to claim 2,
wherein the controller comprises the second delay processor, and
the judgement condition includes at least one of a condition that an absolute value of the difference between the pressure measurement value of the cathode gas flow path and the pressure target value of the cathode gas flow path becomes equal to or less than a predetermined reference value and a condition that an absolute value of an amount of change of the pressure measurement value of the cathode gas flow path per unit time becomes equal to or less than a predetermined reference value.

6. A control method of a fuel cell system comprising a fuel cell stack; a compressor configured to supply a cathode gas to the fuel cell stack through a cathode gas flow path; a pressure regulation valve configured to regulate a pressure of the cathode gas flow path; a flowmeter configured to measure a flow rate of the cathode gas that is to be supplied to the fuel cell stack; and a pressure sensor configured to measure the pressure of the cathode gas flow path,
the control method comprising the steps of:
(i) calculating a torque target value of the compressor and an opening position target value of the pressure regulation valve from a flow rate target value of the cathode gas and a pressure target value of the cathode gas flow path, the flow rate target value of the cathode gas and the pressure target value being determined according to a required power output of the fuel cell stack;
(ii) calculating a torque feedback value of the compressor from a difference between a flow rate measurement value and the flow rate target value of the cathode gas, and controlling the compressor using a torque command value obtained by adding the torque target value and the torque feedback value; and
(iii) calculating an opening position feedback value of the pressure regulation valve from a difference between a pressure measurement value and the pressure target value of the cathode gas flow path, and controlling an opening position of the pressure regulation valve using an opening position command value obtained by adding the opening position target value of the pressure regulation valve and a delayed opening position feedback value that is obtained by delaying the opening position feedback value.

7. The control method of the fuel cell system according to claim 6,
the control method comprising the steps of performing a delay process of delaying the opening position feedback value, wherein the delay process comprises at least one of:
a first delay process of performing at least one of a first-order delay, a second-order delay, and a dead time delay, and a second delay process of replacing the opening position feedback value with zero for a time period from a change of at least one of the torque target value and the opening position target value to satisfaction of a predetermined judgement condition.

8. The control method of the fuel cell system according to claim 7,
wherein the delay process of delaying the opening position feedback value is the second delay process, and
the judgement condition is that an absolute value of the torque feedback value becomes equal to or less than a predetermined reference value.

9. The control method of the fuel cell system according to claim 7,
wherein the delay process of delaying the opening position feedback value is the second delay process, and
the judgement condition includes at least one of a condition that an absolute value of the difference between the flow rate measurement value and the flow rate target value of the cathode gas becomes equal to or less than a predetermined reference value and a condition that an absolute value of an amount of change of the flow rate measurement value of the cathode gas per unit time becomes equal to or less than a predetermined reference value.

10. The control method of the fuel cell system according to claim 7,
wherein the delay process of delaying the opening position feedback value is the second delay process, and
the judgement condition includes at least one of a condition that an absolute value of the difference between the pressure measurement value and the pressure target value of the cathode gas flow path becomes equal to or less than a predetermined reference value and a condition that an absolute value of an amount of change of the pressure measurement value of the cathode gas flow path per unit time becomes equal to or less than a predetermined reference value.

\* \* \* \* \*